UNITED STATES PATENT OFFICE.

ADAM McCRACKEN, OF DUNEDIN, NEW ZEALAND.

PROCESS OF MANUFACTURING SAFETY-EXPLOSIVES.

SPECIFICATION forming part of Letters Patent No. 730,288, dated June 9, 1903.

Application filed September 5, 1902. Serial No. 122,267. (No specimens.)

*To all whom it may concern:*

Be it known that I, ADAM MCCRACKEN, pastoralist, of 2 Commercial Chambers, Manse street, Dunedin, New Zealand, have invented a certain new and useful Improved Process of Manufacturing Safety-Explosives, of which the following is a specification.

This invention relates to a process of modifying the nature of picric acid and glycerin in a manner which renders it much safer for use than heretofore.

I take picric acid and dissolve same in glycerin at a temperature of 212° Fahrenheit. After being so dissolved I neutralize same by the addition of carbonate of ammonia, and while in a dissolved state I add thereto infusorial earth or other material having with the above-named mixture the like effect and so producing what I term "picrated mixture." Any remaining moisture is evaporated by heat. The next stage of my process consists in the addition of nitrate of potash which has been previously dissolved in boiling water. The mixture is then kept boiling and continuously stirred at a temperature of 240° Fahrenheit until the whole is comparatively dry. A small percentage of sulfur may then be added. The said compound is now laid out in trays and thoroughly dried in the sun, or the trays may be arranged and laid in sheds fitted with louver-boards. The said operations are simple and safe, the result being the production of explosive of high power.

The explosive can be produced in either powdered or granular form and may be compressed into various sizes.

I employ the following ingredients in the preparation of my explosive, which proportions may be slightly altered, according to quality of materials used: twenty parts picric mixture containing one-half as much glycerin as picric acid, sixty parts nitrate of potash, fifteen parts infusorial earth, five parts sulfur.

Having now particularly described and ascertained the nature of my invention and in what manner the same is to be performed, I declare that what I claim is—

1. The herein-described method of manufacturing an explosive compound which consists in dissolving picric acid in glycerin, adding thereto infusorial earth, then adding an aqueous solution of nitrate of potash, boiling the mixture, adding a small quantity of sulfur thereto, and finally thoroughly drying the same, substantially as described.

2. The herein-described method of manufacturing an explosive compound which consists in dissolving picric acid in glycerin, neutralizing the same by carbonate of ammonia, adding thereto infusorial earth, then adding an aqueous solution of nitrate of potash, boiling the mixture, adding a small quantity of sulfur thereto, and finally thoroughly drying the same, substantially as described.

In witness whereof I have hereunto set my hand in presence of two witnesses.

ADAM McCRACKEN.

Witnesses:
J. F. HARPER,
J. R. PARK.